(12) United States Patent
Robinson

(10) Patent No.: US 10,735,568 B2
(45) Date of Patent: Aug. 4, 2020

(54) SMARTPHONE SAFETY DEVICE

(71) Applicant: Nicholas Robinson, Danvers, MA (US)

(72) Inventor: Nicholas Robinson, Danvers, MA (US)

( * ) Notice: Subject to any disclaimer, the term of this patent is extended or adjusted under 35 U.S.C. 154(b) by 0 days.

(21) Appl. No.: 16/392,356

(22) Filed: Apr. 23, 2019

(65) Prior Publication Data
US 2019/0373091 A1   Dec. 5, 2019

Related U.S. Application Data

(60) Provisional application No. 62/669,932, filed on May 10, 2018, provisional application No. 62/677,864, filed on May 30, 2018.

(51) Int. Cl.
*H04M 1/02*  (2006.01)
*H04N 5/225*  (2006.01)

(52) U.S. Cl.
CPC ........ *H04M 1/0264* (2013.01); *H04N 5/2252* (2013.01); *H04N 5/2254* (2013.01)

(58) Field of Classification Search
CPC .. H04N 5/2254; H04N 5/2252; H04M 1/0264
See application file for complete search history.

(56) References Cited

U.S. PATENT DOCUMENTS

| | | | |
|---|---|---|---|
| 2013/0011127 A1* | 1/2013 | Lawton | H04N 5/2254 396/71 |
| 2016/0065808 A1* | 3/2016 | Eromaki | H04M 1/0214 348/373 |

\* cited by examiner

*Primary Examiner* — Christopher K Peterson
(74) *Attorney, Agent, or Firm* — Alan F. Feeney, Esq.; Feeney IP Law

(57) ABSTRACT

A device comprising a means to re-direct the line of sight of a camera function of a smartphone.

17 Claims, 13 Drawing Sheets

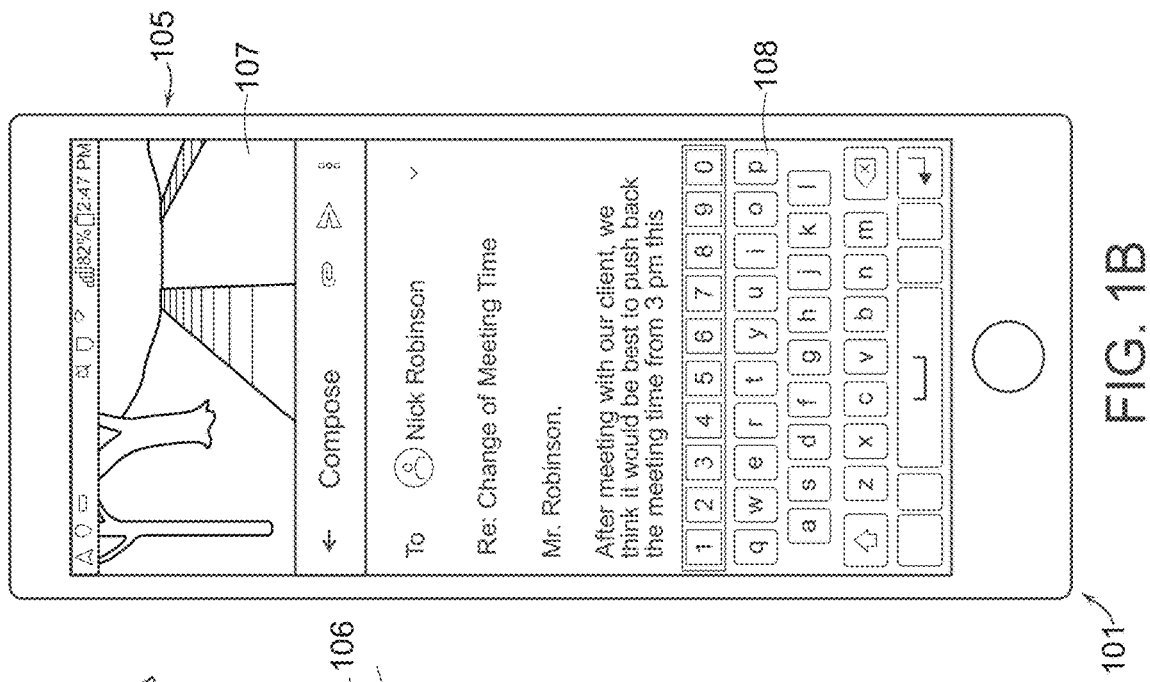
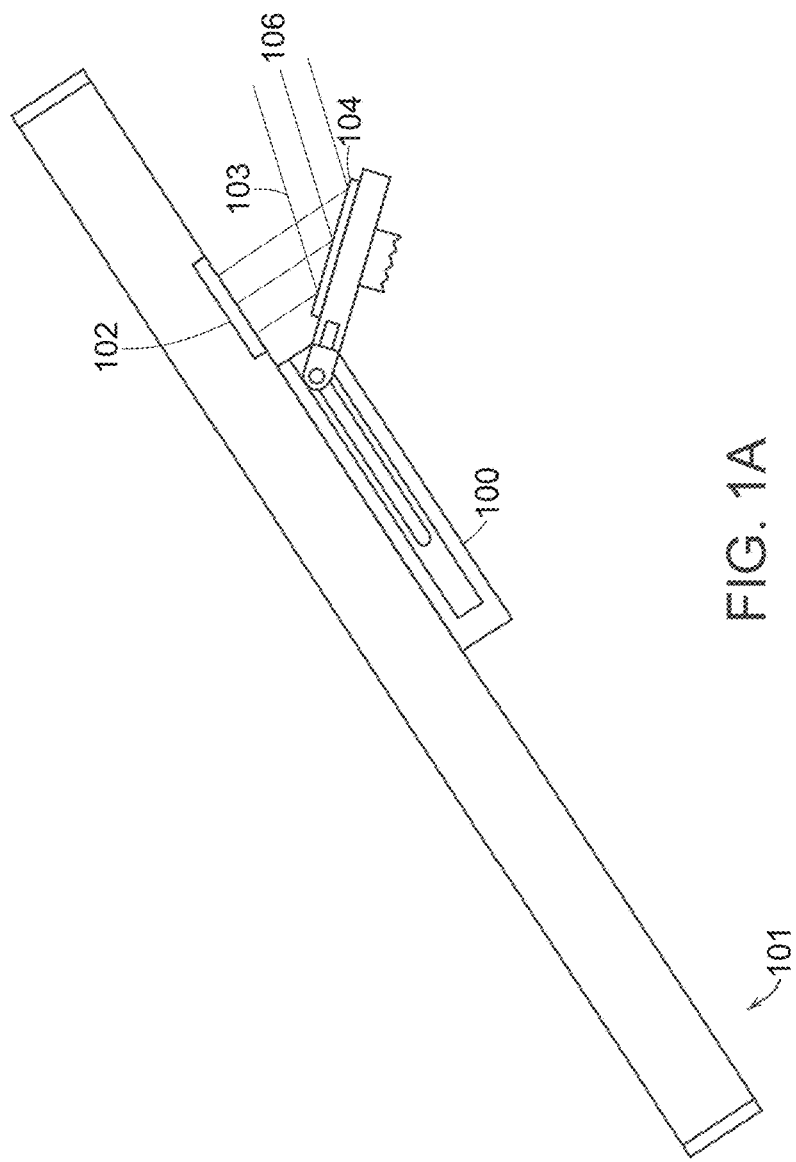
FIG. 1A
FIG. 1B

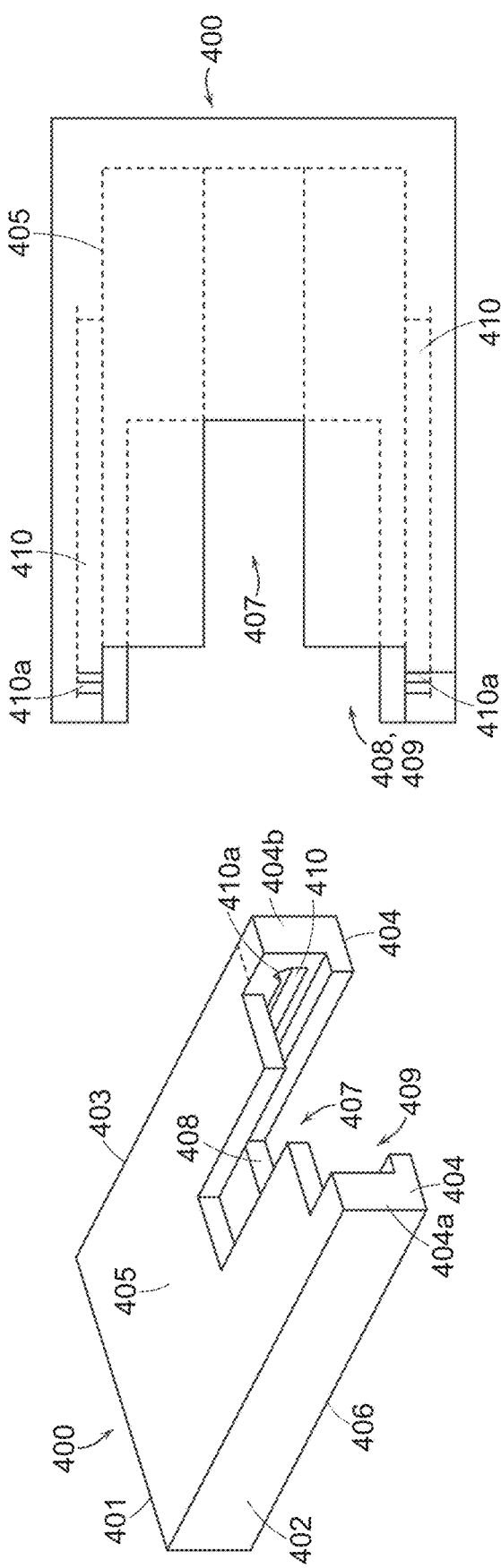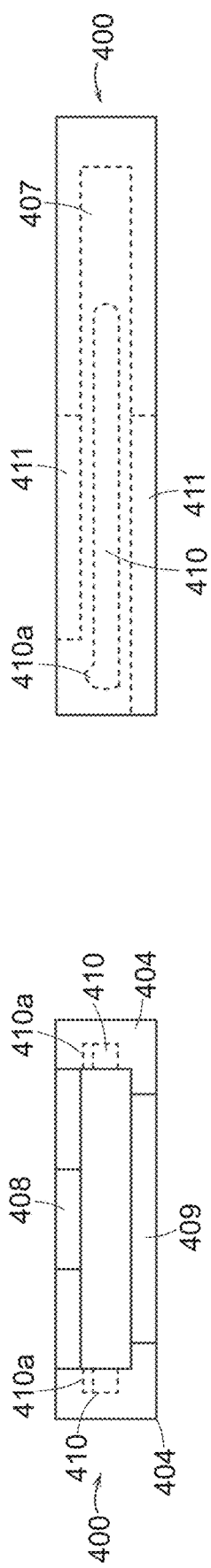
FIG. 4B
FIG. 4D
FIG. 4A
FIG. 4C

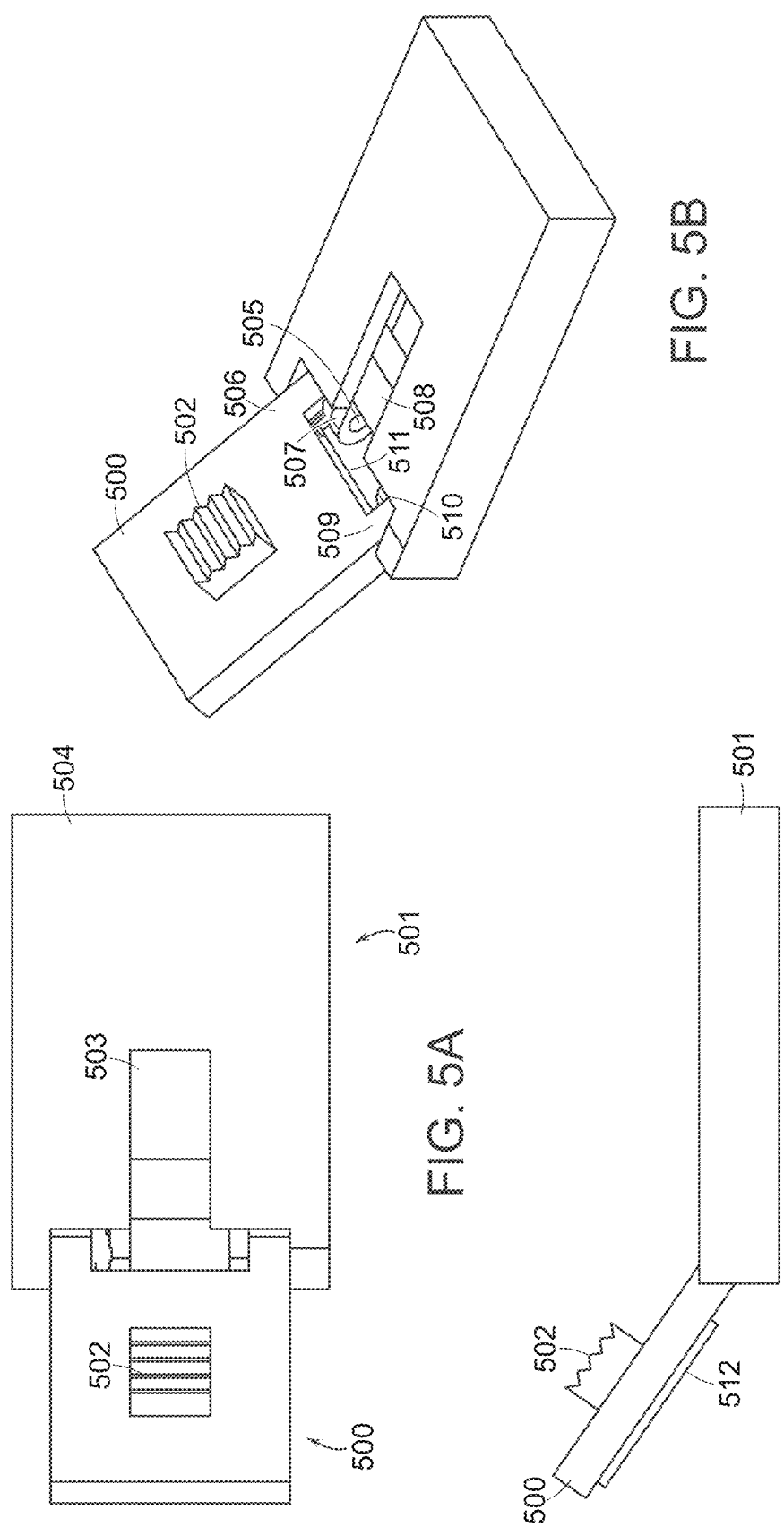

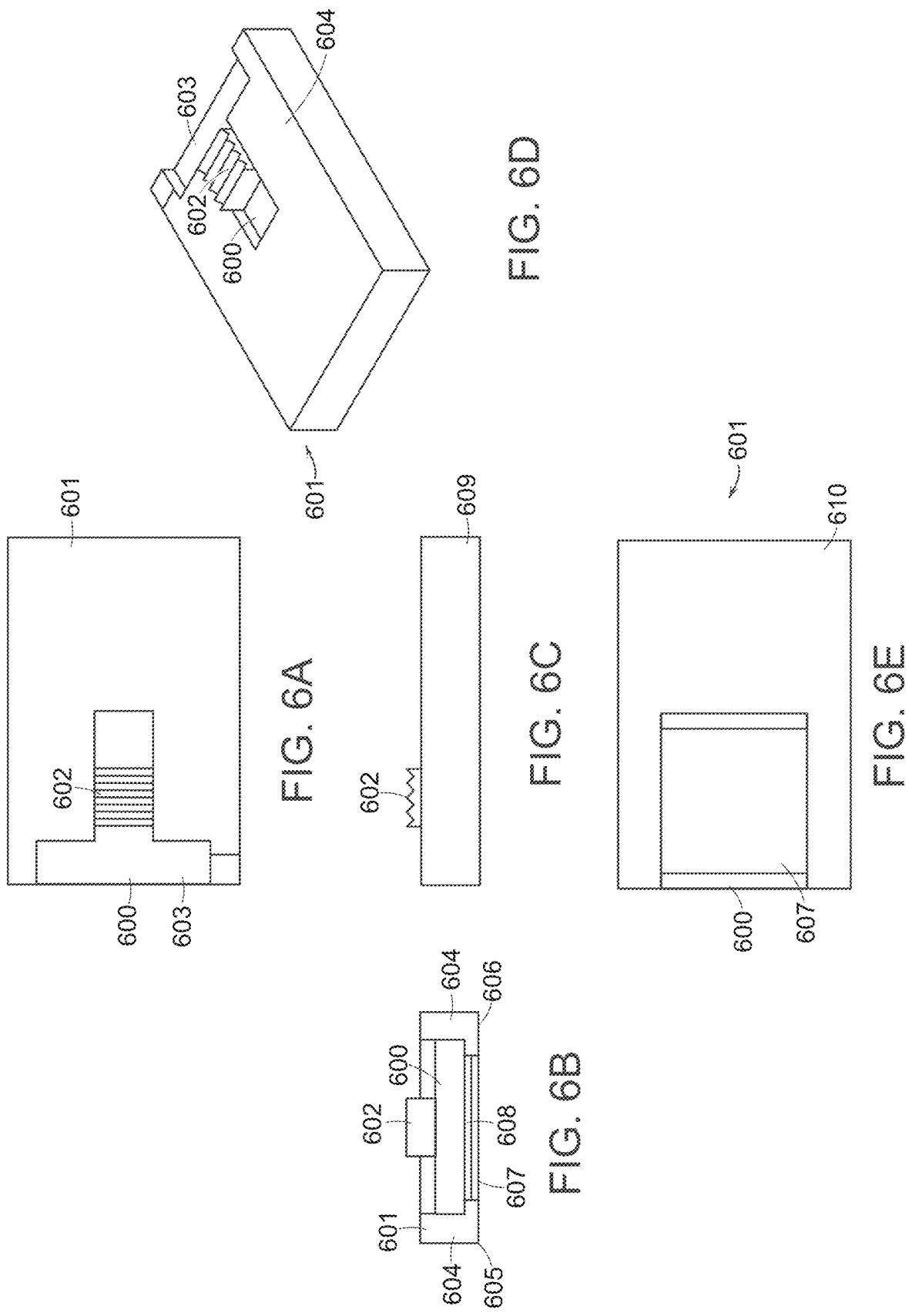

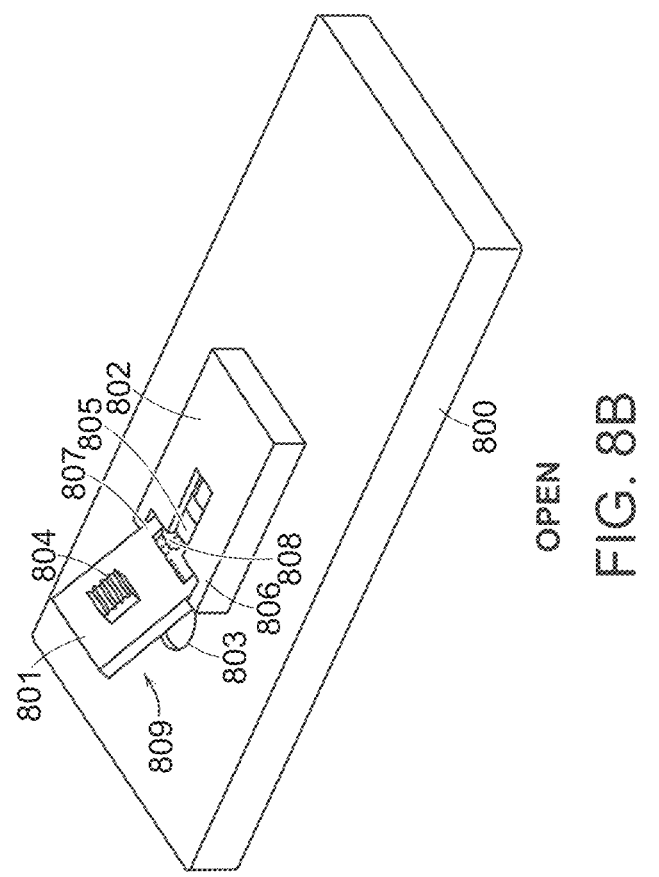
FIG. 8B OPEN
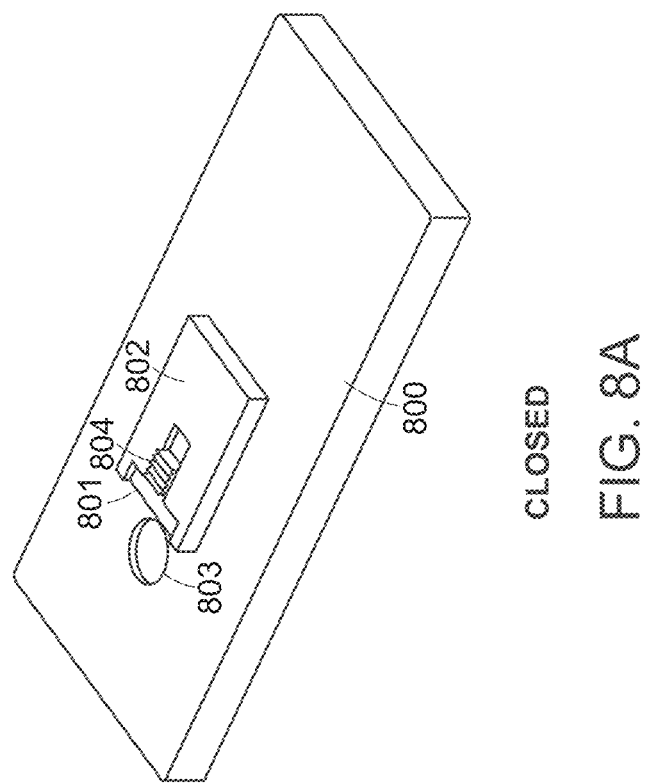
FIG. 8A CLOSED

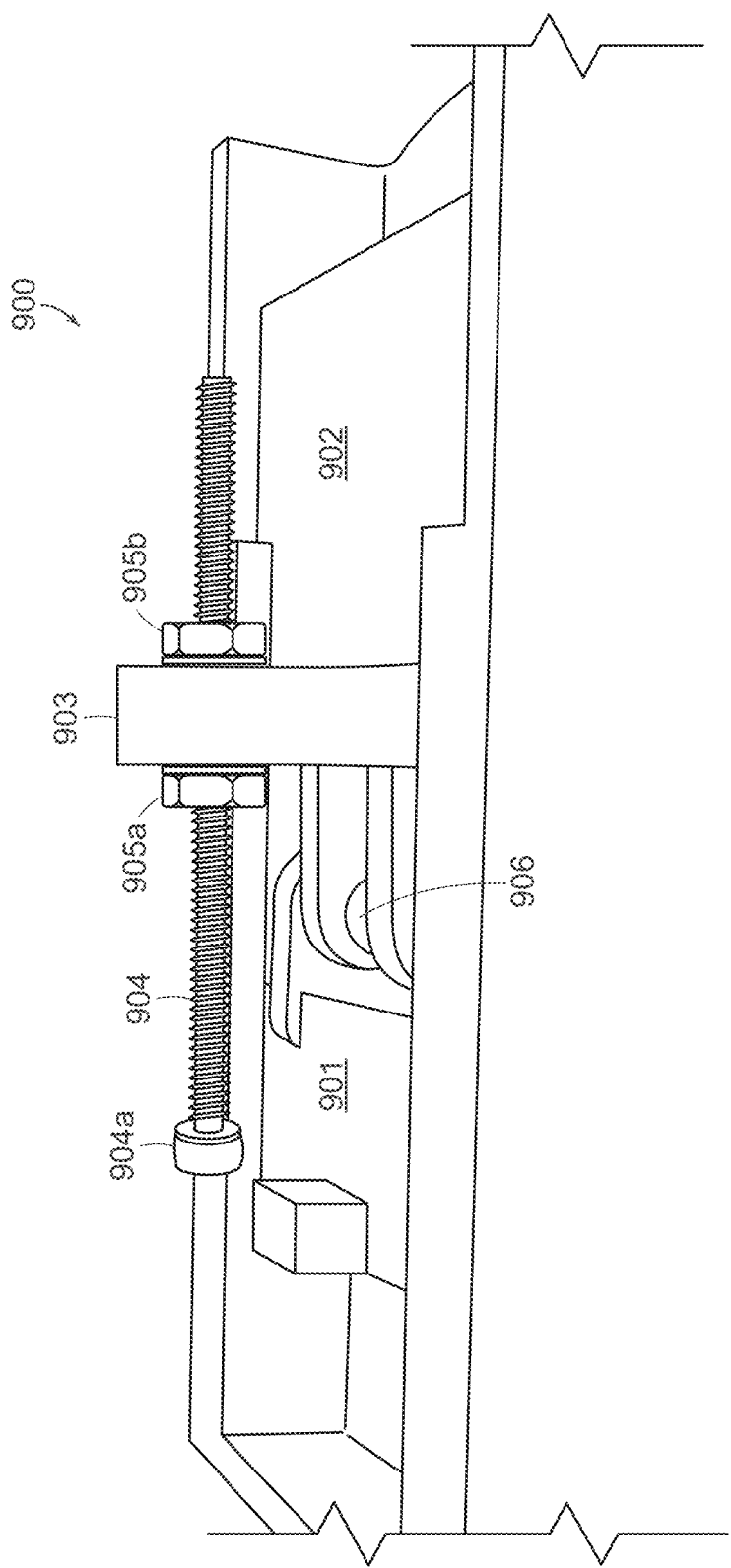

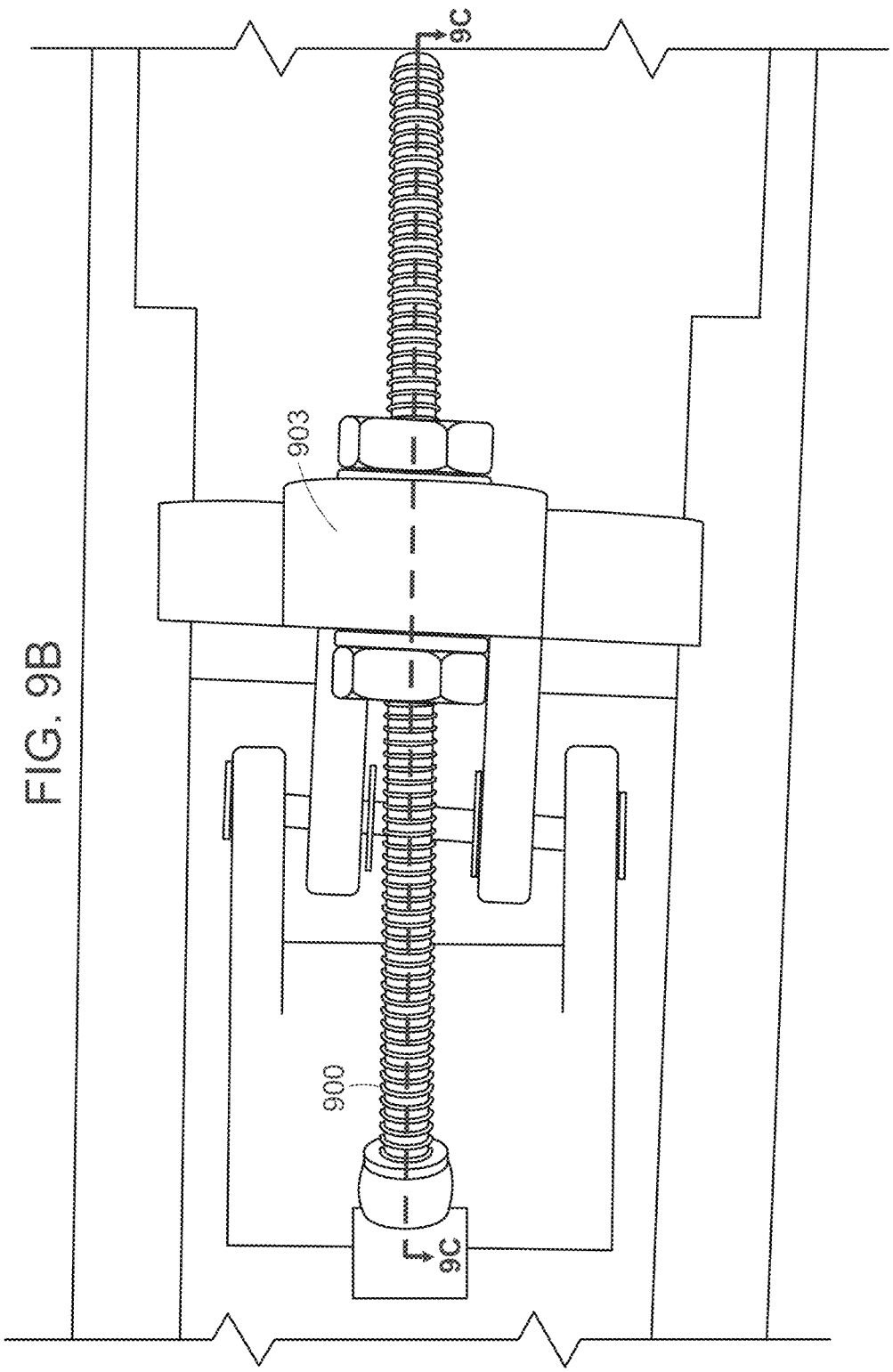

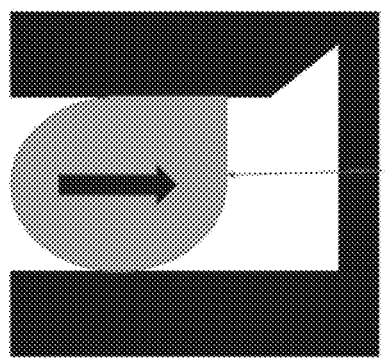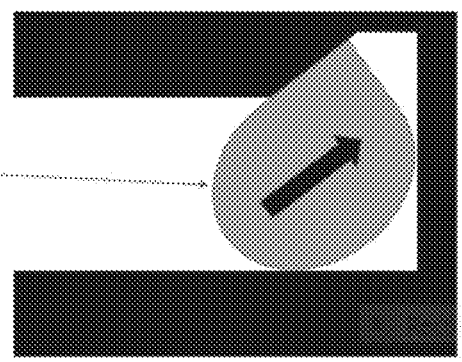
FIG 11a  FIG. 11b
FIG. 11

SMARTPHONE SAFETY DEVICE

CROSS-REFERENCE TO RELATED APPLICATIONS

This application claims the benefit of U.S. Provisional Application 62/669,932 filed May 10, 2018, and U.S. Provisional Application 62/677,864 filed May 30, 2018.

BACKGROUND OF THE INVENTION

The problem of distracted walking is a relatively new one. Each year, more and more people are injured as a result of texting, talking or listening to music while on their cell phones. According to data from the National Highway Traffic Safety Administration (NHTSA), nearly 5,000 pedestrians were killed and an estimated 76,000 injured in traffic collisions in the United States in 2012; nearly one death every 2 hours and an injury every 7 minutes. The issue has become such a problem that some towns, such as Fort Lee, N.J., have banned texting while walking. If caught texting while jaywalking in that town, violators face an $85 fine. In London, England, some lamp posts have been padded in order to protect the large numbers of people using their mobile devices while walking. Even New York City has lowered the speed limit in some areas as a way to help cut down on the number of pedestrian injuries. Arkansas, Illinois, and New York have all tried unsuccessfully to ban using a mobile device while walking.

Common risks associated with distracted walking include: injuring someone else, tripping, sprains, strains, fractures, cuts, bruises, broken bones, concussions, brain injuries, spinal cord injuries, and death. In 2008, more than 1,000 people were injured seriously enough to seek medical attention at the emergency room as a result of texting and walking—double the year previous (which was double the year previous as well). In 2010, researchers at The Ohio State University estimated that 1,500 pedestrians were treated in emergency rooms for injuries related to using their cell phones while walking; an increase of 50% from just two years prior.

A study published in 2012 by researchers from New York's Stony Brook University found that those who texted while walking were 60 percent more likely to veer off line than non-texters. Scientists call the phenomenon "inattentive blindness." The human brain has evolved to only be able to adequately focus attention on one task at a time.

When Safe Sound Family analyzed the data in the Consumer Product Safety Commission's (CPSC) National Electronic Injury Surveillance System (NEISS)—which estimates the number of injuries nationwide based on reports by 100 participating hospitals—it was found that there were nearly 5,000 estimated cases of injuries caused by phones and phone accessories that occurred on roads or highways and in other public places (not at home) that were treated in hospital in the United States in 2013. The number of actual injuries caused by distracted walking is bound to be quite higher than this, as the data from the CPSC only looked at those injuries which resulted in medical treatment at a participating hospital, and minor injuries were likely treated at home or another medical treatment facility not included in the reporting data. There is also the stigma and shame associated with reporting an injury in which one is partially at fault, and so some people may not have been upfront with the fact that they were using a mobile device when their injury occurred.

In addition to texting while walking, talking, checking email, using social networking apps and even playing games all contribute to the problem of distracted pedestrians.

According to data via the National Highway Traffic Safety Administration, the highest percentage of pedestrian deaths relative to all traffic fatalities occurs in New York City (51%), Los Angeles (42%) and Chicago (30%). After years of decline, pedestrian deaths have started to increase since 2009, and while there is no reliable data directly related to cell phone use, experts speculate that the increase is due in part to distracted users on their cell phones while walking.

Researchers from Ohio State University found that young people (under the age of 25) are more likely to be injured while on their cell phones, and men are more likely than women to be injured while using a mobile device. Their statistics showed that talking on the phone made up about 69 percent of injuries, while texting only accounted for about 9 percent.

One of only a few studies focusing on the issue, found that although pedestrian injuries overall had dropped, ER visits tripled between 2004 and 2010 for pedestrians using cell phones. No doubt as more data is collected on the issue, the numbers of those affected by distracted walking will continue to rise.

Augmented reality software which "films" a user's surroundings currently exist; for example, the following apps: Type While Walk: https://itunes.apple.com/us/app/type-while-walk/id721584816?mt=8; and Walking Text: https://play.google.com/store/apps/details?id=com.andpi.walktext. There are, however, problems associated with these apps. For instance, when such an app is in activated, the user only has a view of his or her feet, as depicted in FIG. 10, or, if the user wants to "see" what is in front of his or her, must hold his or her smartphone straight outward at a 90° angle from their body; an uncomfortable position which quickly results in fatigue to the user's arm.

There is a need, therefore, to make smartphones "smarter" for users when walking. More particular, a device capable of providing the user with an image of his or her immediate surroundings while the user is walking and texting (or using an app) that is natural for the user (increasing user compliance) and does not cause the user fatigue.

BRIEF SUMMARY OF THE INVENTION

The claimed invention is a smartphone attachment capable of re-directing the line-of-sight of the rear-facing camera function by approximately 45° relative to normal. The device is designed to be retractable into a secure housing when not in use or when the user desires to use the camera function of the smartphone. When engaged, the device is able to slide over the camera lens of the smartphone to which it is attached, sufficiently out the way of the camera lens so that the camera can function normally. The device is used in conjunction with an application which pulls video feed from the rear camera, mirrors it both vertically and horizontally, and isolates sections which have been reflected. The isolated sections of video feed are converted into a semi-transparent overly which can be seen by the user even when the user is utilizing another application such as Mapquest® or GoogleMaps®. It is this function that allows users to engage their smartphone's functions, such as texting, while still being able to see the environment in front of them. It is important that the user be able to hold the smartphone as they would instinctively if they were not walking.

BRIEF DESCRIPTION OF THE DRAWINGS

FIG. 1A is a side view of the invention when it is in use;

FIG. 1B is an illustration of what the user sees on their smartphone screen when the device is in use and the user is reading an email;

FIGS. 4A-4D are various views of the rectangular body frame;

FIGS. 5A-5C are various views of the claimed device after the reflective means support has been "slid" out of the rectangular body frame;

FIGS. 6A-6D are various views of the claimed device after the reflective means support has been "slid" into the rectangular body frame for storage;

FIG. 6E is a view from the perspective of the lower wall of the rectangular body frame after the reflective means support has been fully inserted into rectangular body frame;

FIGS. 8A-8B are depictions of a device that has been mounted to the back of a smartphone when the reflective means support is stored within the interior of the rectangular body frame (FIG. 8A) and when it has been extracted and is ready to be used (FIG. 8B);

FIGS. 9A-9C illustrate the rear stopping mechanism formed into the top wall of the rectangular body frame in some embodiments;

FIG. 11 are illustrations of an enlarged view of the "stopping" cams when the cam is in the channel (left FIG. 11a) and the device is in the "closed position" and when the cam is in the "upward notch" and the device is in an "open position" (right FIG. 11b).

DETAILED DESCRIPTION OF THE INVENTION

Figure 2:
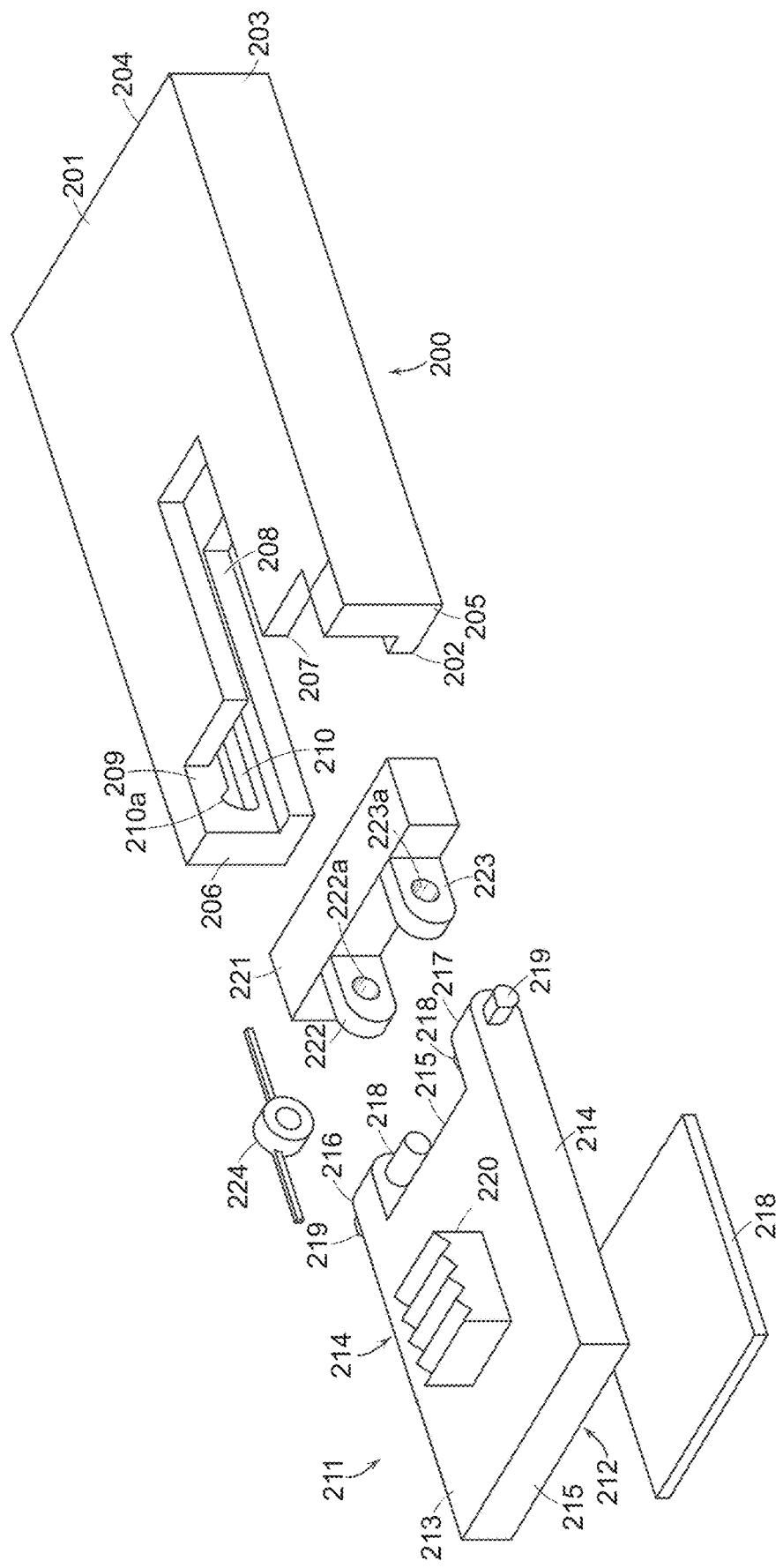
FIG. 2 is an exploded view of the invention.

In the following detailed description, reference is made to the accompanying drawings. The examples in the description and drawings should be considered illustrative and are not intended as limiting to the specific example or element described. Multiple examples can be derived from the following description and drawings through modification, combination or variation of the different elements.

The disclosure is directed to a device that is attached to the back of a smartphone, such as an iPhone or Android phone, just below the lens of the smartphone's camera that re-directs that line of sight of the user into the lens of said camera. The device includes a reflective means, preferably a mirror that, when the device is in use, reflects the image of the user's surroundings. The reflected image is displayed on the screen of the smartphone while the user simultaneously engages other features and functions of her smartphone. When employed, the user can be aware of potential hazards in front of the user without having to continuously look up from their smartphone.

Definitions

As used herein, "cam" or "cams" refer to a cylinder having an irregular form such that its motion, usually rotary, gives to a part or parts in contact with it a specific rocking or reciprocating motion.

As used herein, "channel" refers to a groove or furrow cut into or formed as a part of a wall.

As used herein, "crimp" or "crimped" refer to the ability to fold the edges of (sheet metal) to make a lock seam.

As used herein, "slot" refers to a long, narrow aperture or slit for something to be inserted As used herein, "smartphone" refers to a mobile phone that performs many of the functions of a computer, typically having a touchscreen interface, Internet access, and an operating system capable of running downloaded applications.

FIG. 1A depicts the device 100 mounted to the back of a smartphone 101 (or other device having a camera feature 102) at the angle of use 103. An image of the user's surrounding is reflected off a reflecting means 104 into the camera 102 of the smartphone 101. In one example, the reflecting means 104 is a mirror. FIG. 1B depicts what the user observes when the device 100 is in use. The image of the user's surroundings 105 is reflected 106 into the camera 102 of a standard smartphone 101 and is displayed on the smartphone's screen 107. The user is still able to access other functions 108 of the smartphone 101 as well as smartphone applications, such as mail functions, map services and the like.

FIG. 2 is an exploded view of one example of a smartphone safety device. A rectangular body 200 is formed from a top wall 201, bottom wall 202, two vertical walls 203, one horizontal side wall 204, and a second, opposing partial side wall 205. The side wall 205 closest to the lens of the smartphone camera is partially removed leaving two opposing "L" sections 205, 206 (the "rectangular body frame"). The interior 207 of the rectangular body frame 200 may be completely or partially hollow. A "T" shape 208 is cut out of the top wall 201. An opposing "T" shape is cut from the bottom wall 202. The interior side walls 209 of the rectangular body frame 200 include opposing grooves or channels 210 capable of accepting securing means (in the example cams).

A rectangular support (the "reflective means support") 211 having a lower wall 212, an upper wall 213, two opposing vertical walls 214, and a top and bottom horizontal wall 215 with two extensions, i.e. legs 216, 217, at opposing corners is used to support a mirror (the "reflective means") 218. Both legs 216, 217 of the bottom horizontal wall 215 have inward facing pegs 218 and outward facing cams 219. The reflective means support 211 is designed to be completely inserted into the rectangular body frame 200 when the devise is not used and extend outward from the smartphone on which it is mounted when the device is used. The reflective means support 212 is secured to the claimed device by the rectangular body frame 200. In the example illustrated in FIG. 2, the outward facing cams 219 are designed to be inserted into the interior grooves or channels 210 of the rectangular body frame 200 and are capable of sliding within said grooves or channels 210 while securing the reflective means support 211 to the rectangular body frame 200. Once installed, the outward facing cams 219 slide in a downward direction when the reflective means support 211 is inserted back into the rectangular body frame 200 for storage. When the user intends to use the device, the same cams 219 slide upward in the grooves or channels 210 towards the lens of the smartphone camera. Upward indentations 210a are located at the end of the grooves or channels 211 closest to the camera lens. These indentations 211a "lock in" the reflective means support 211 when it is fully-extended outward from the rectangular body frame 200 at the desired angle.

A thumb slide 220 consisting of a primarily rectangular body with outward facing ribs allows the user to slide the reflective means support 211 in and out of the rectangular body frame 200. The reflective means 218 is secured to lower wall 212 of the reflective means support 211 while the thumb slide 220 is attached to the upper wall 213 of the reflective means support 211. In the example illustrated in the figures, the thumb slide 220 has a series of equidistant, outward extending ribs of equal size and shape. The thumb slide 220 provides the user with a better grip of the reflecting means support 211 when the user extends the reflecting means support 211 out of or into the inner recess 207 of the rectangular body frame 200. It should be appreciated that the thumb slide 220 may have different designs. For instance, the thumb slide 220 may be in the shape of the head of a nail with the flat, horizontal portion situated above the upper wall 201 of the rectangular body frame 200 of the device. To extend the reflective means support 211 out of the rectangular body frame 200, the user pushes on the head of the nail-like feature of the slide with her thumb in an upward direction towards the camera lens. To retract the reflective means, the user pushes the nail head downward towards the palm of her hand. The thumb slide 220 is designed to extend out of the "T" or "I" cut out 208 and move upward and downward in same without contacting the walls of said "T" or "I" cut out 208. It should be appreciated that the device may be designed without a thumb slide. In this example, the user merely applies force to the back of the reflective means support 212.

A yolk like feature ("the rear support") 221 that fits within the rectangular body frame 200 is attached to the reflective means support 211 by accepting the opposing inwardly facing, rotatable pegs 218 located on the interior walls of the legs 216, 217 of the reflective means support 211. The rear support 221 includes two extensions 222, 223 having holes 222a, 223a which accept the inwardly facing pegs 218 located on the reflective means support 211. The inwardly facing pegs 218, when inserted into the holes 222a, 223a of the rear support 221, secure the reflective means support 211 to the rear support 221. The inwardly facing pegs 218 rotate within the holes 222a, 223a found in the rear support extensions 222, 223 when the device is assembled. It is this rotation that allows for the reflective means support 211 with the affixed mirror 218 to extend outward from the smartphone when in use.

A torsional spring 224 projects the reflective means support 211 outward to the desired angle. A slot (not shown) is formed into the rear support 221 next to one of its legs 222, 223. This slot supports the torsional spring 224 which rotates within it when the device is in use. The torsional spring 224 is mounted on the inwardly facing pegs 218 located on the legs 216, 217 of the reflective means support 211 and is capable of rotating on said pegs 218. As the user slides the reflective means support 211 upward out of the rectangular body frame 200, the torsional spring 224 rotates about the inwardly facing pegs 218 forcing the reflective means support 211 outward and to the desired angle causing the mirror 218 to reflect the image of the user's surroundings into the smartphone's camera.

In the Example depicted in FIG. 2, a mirror 218 is used as the preferred reflective means. The mirror 218 is attached to the reflective means support 211 by any number of known adhesives. Various types of possible means to permanently attach the mirror 218 to the reflective means support 211 include, but are not limited to acrylics, bio-adhesives, contact adhesives, cyanoacrylics, epoxies, ethylene-vinyl acetate-based hot-melts, glue, hot melt adhesives, neoprene, paste, polymer dispersion adhesives, pressure sensitive adhesives, resins, polyimides, polyols, polyurethane, pressure sensitive adhesive, rubber cement, thermoset epoxies, thermosetting polymers, ultraviolet light curing adhesives, and urethanes. The reflective means support may also be designed with upward side walls having inwardly facing flanges. The reflective means 218, such as a thin mirror, is "slid" into the space created by these side walls and is held in place by the inwardly facing flanges. The flanges and/or upward side walls may be made from a material that may be crimped after the mirror is slide into the space within the upward side walls. The crimping creates a tight fit for the mirror keeping it in place once installed.

Figure 3B:
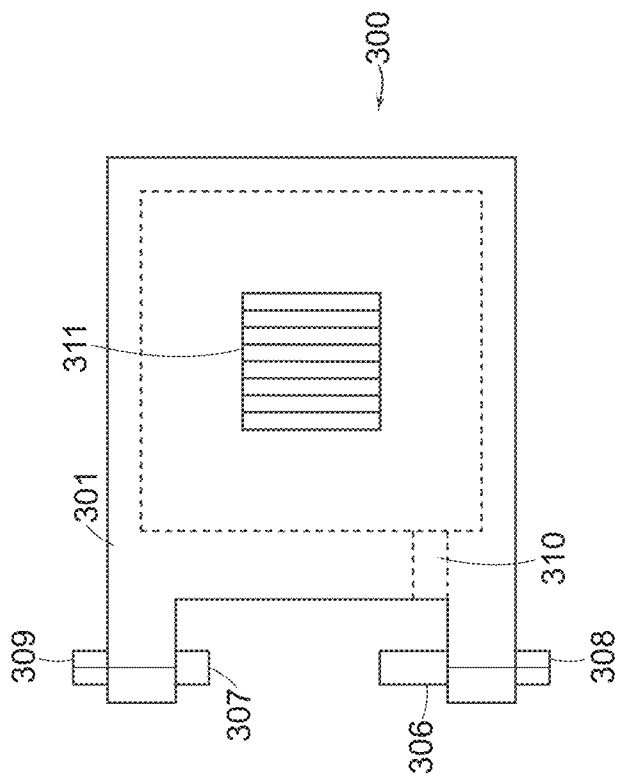
FIGS. 3A-3D are various view of the reflective means support.
Figure 3D:
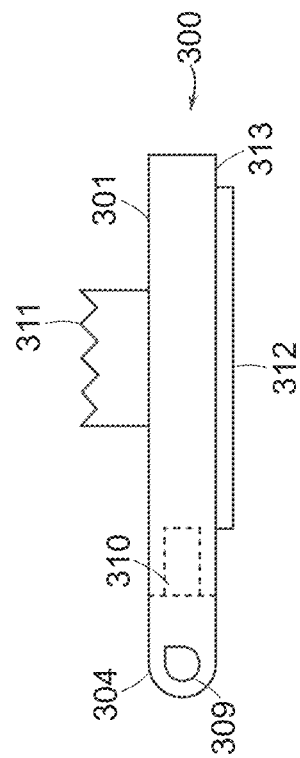
Figure 3A:
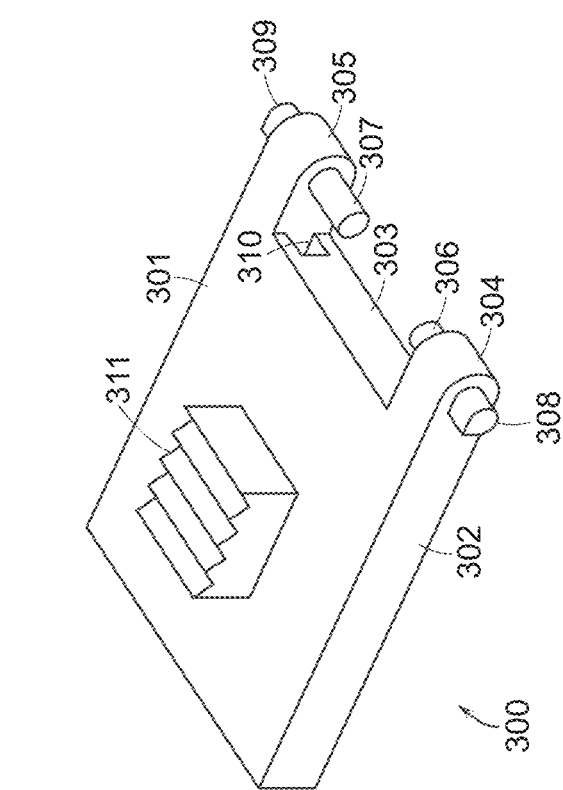
Figure 3C:
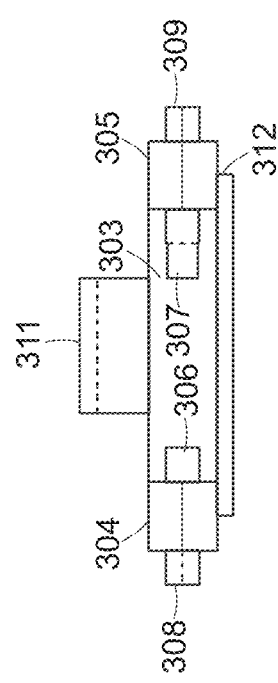

FIG. 3A depicts an enlarged side view of the reflective means support 300. The upper wall 301, the left vertical wall 302, the bottom horizontal wall 303 with downwardly extending legs 304, 305 having inwardly facing pegs 306, 307 and outwardly facing cams 308, 309 are shown. The slot 310 in which the torsional spring is situated is shown next to the right extending leg 305. The thumb slide 311 is also shown. FIG. 3B is a top view of the reflective means support 300. The mirror 312 attached to the lower wall that opposes to upper wall 301 shown, is depicted by a dotted line as is the slot 310 in which the torsional spring is located. FIG. 3C is a view from the bottom horizontal wall 303 illustrating the relationship of the attached mirror 312 to the thumb slide 311, extending legs 304, 305 and the pegs/cams attached to said legs 306, 307, 308, 309. FIG. 3D is a side view of the reflective means support 300. As shown, the thumb slide 311 is affixed to the upper wall 301 whereas the mirror 312 is attached to the opposing lower wall 313. The slot 310 in which the torsional spring is situated is represented by dotted line. An outwardly extending peg 309 which engages groove/channel imbedded in the interior wall of the rectangular body frame is shown.

FIGS. 4A-4D illustrate several views of the rectangular body frame 400. FIG. 4A is a partial side view looking into the frame 400 from the side that engages the reflective means support. The rectangular body frame 400 includes a back horizontal wall 401, two side vertical walls 402, 403, a partial front horizontal wall 404, a top wall 405, a bottom wall 406 and an interior space 407. Both the top wall 405 and the bottom wall 406 have a "T" shaped cut outs 408, 409 which provide access to the thumb slide. The front wall 404 has been designed to allow for the reflective means support to be "slid" into the interior 407 of the rectangular body frame 400. The front wall 404 consists of two "L" shaped portions 404a, 404b. The groove/channel 410 formed into the interior of the right vertical wall 403 is shown (the opposing groove/channel is not shown). The peg on the outer wall of the right leg of the reflective means support slides within this groove/channel 410 when the reflective means support is extended out of or inserted into the rectangular body frame 400. The upward notch 410a located at the end of the groove/channel 410 which "locks" the reflective means support in place when the reflective means support is fully-extended outward is shown. FIG. 4B is a view of the rectangular body frame 400 from the top wall 405. The interior space 407 of the rectangular body frame 400 and the grooves/channels 410 for the outward cams of the reflective means support are represented by dotted lines. FIG. 4C is a view of the rectangular body frame 400 from the perspective of the partial front wall 404. The grooves/channels 410 embedded into the interior walls of the side vertical walls 402, 403 are depicted by dotted lines. FIG. 4D is a side view of the rectangular body frame 400. The open interior 407, side wall groove/channel 410 with locking notch 410a, and a portion of the "T" cutout 411 are shown by dotted lines.

FIGS. 5A-5C are representations of the device when it is in use. As shown, the reflective means support 500 has been fully-extended out of the rectangular body frame 501. FIG. 5A is view looking downward. The user has used the thumb slide 502 which extended out of the "T" shaped cutout 503 in the top wall 504 of the rectangular body frame 501 to push the reflective means support 500 out of the recess of the rectangular body frame 501. The torsional spring (not shown) forced the reflective means support 500 outward at an angle to reflect the image before the user into the lens of the smartphone (not shown) the devices is attached. FIG. 5B is a side view of the device when it is fully-extended. As shown, the inwardly facing peg 505 affixed to the right leg 506 of the reflective means support 500 has been inserted into the hole of the right extension 507 of the rear support 508. The inwardly facing peg (not shown) on the left leg 509 of the reflective means support 500 has also been inserted into the hole of the left extension 510 of the rear support 507 as well. The pegs rotate within the holes of the extensions of the rear support 507. The torsional spring 511 pushed the reflective means support 500 outward to the desired angle. FIG. 5C is a side view of the claimed device after the reflective means support 500 has been pushed out of the rectangular body frame 501 by the thumb slide 502 and extended outward by the torsional spring 511 to the desired angle. The mirror 512 affixed to the side opposing the thumb slide 502 (the lower side) reflects the surroundings of the user into the lens of the smartphone (not shown) on which the device is affixed.

FIG. 6 depicts the claimed device when the reflective means support 600 has been retracted into the rectangular body frame 601 for storage. FIG. 6A is a top view of the rectangular body frame 601 wherein the thumb slide 602 has been used to slide the reflective means support 600 into the interior space of the rectangular body frame 601. The "T" shaped cut out 603 allowed the user sufficient access to said thumb slide 602. As depicted, the reflective means support 600 is contained completely within the rectangular body frame 601. FIG. 6B is a view from the partial bottom horizontal wall 604 looking into the interior of the rectangular body frame 601 after the reflective means support 600 has been slid into the rectangular body frame 601. From this angle, the thumb slide 602, "L" shaped partial wall sections 605, 606 of the top horizontal wall 604, top wall 605 of the reflective means support 600, mirror 607 and bottom wall 608 of the rectangular body frame 601 are visible. FIG. 6C is a view from one of the side walls 609 of the rectangular body frame 601 showing the thumb slide 602 after it has been used to insert the reflective means support 600 into the interior of the rectangular body frame 601. FIG. 6D is an angled view of the claimed device after the user has engaged the thumb slide 602 along the "T" shaped cutout 603 in the top horizontal wall 604 of the rectangular body frame 601 to position the reflective means support 600 in the rectangular body frame 601. FIG. 6E is a view from the perspective of the underside of the claimed device after the reflective means support 600 has been fully inserted into the interior of the rectangular body frame 601. FIG. 6E is a view from the perspective of the lower wall 610 of the rectangular body frame 601 after the reflective means support 600 has been fully inserted into rectangular body frame 601. The mirror 607 is visible through the "T" shaped cutout 603 formed into the lower wall 610 of the rectangular body frame 601.

Figure 7A:
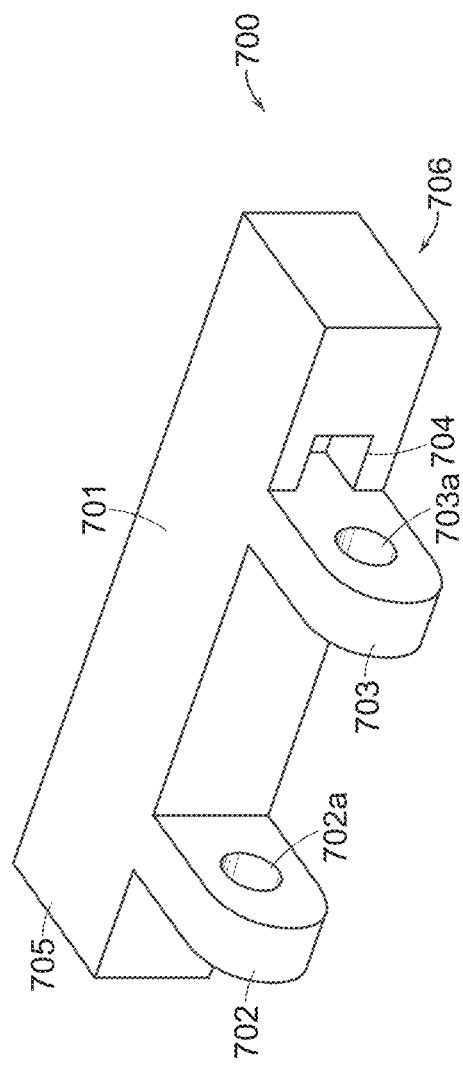
FIGS. 7A-7D are various views of the rear support.
Figure 7B:
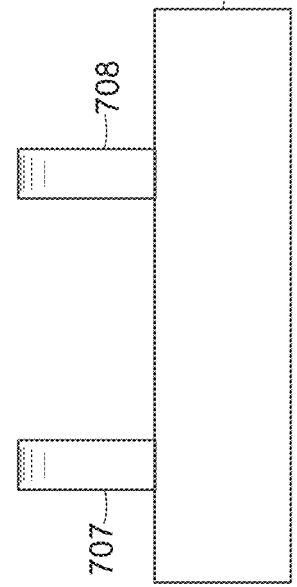
Figure 7C:
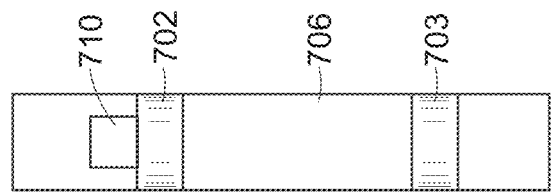
Figure 7D:
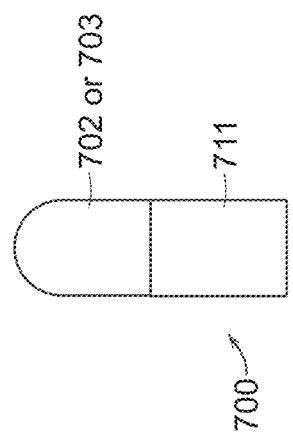

FIGS. 7A-7D are various views of the rear support 700 which accepts the interior pegs found on the legs of the reflective means support allowing same to rotate about said rear support when in use. As shown in FIG. 7A, the rear support 700 comprises a rectangular body 701 having two extensions 702, 703 with holes 702a, 703a traversing the entire width of said extensions. These holes 702a, 703a accept the interior pegs found on the legs of the reflective means support. In the preferred embodiment, the rear support 700 has the same dimensions for length and height as the reflective means support. It should be appreciated that in other examples said dimensions may be different provided that the rear support 700 is still capable of accepting the aforementioned interior facing pegs of the reflective means support. The slot 704 in which the torsional spring is situated is shown. FIG. 7B is a side view of the rear support 700 from the perspective of the top 705 or bottom 706 horizontal wall. The extensions 707 and 708 having holes in which the interior pegs of the reflective means support are shown. FIG. 7C is a view of the rear support 700 from the perspective of the bottom wall 706 of said support. The outer edges of the rear support extensions 702, 703 are shown. The slot 710 in which the torsional spring is situated is also shown. FIG. 7D is a view of the side of the rear support 700 from the perspective of one of the vertical walls 711 of the rear support. The side of one of the extensions 707 and 708 is shown.

FIG. 8A illustrates the device when it is not in use. It is desirable that the reflective means (not shown) and its support 801, when not in use, is flush with the smartphone 800 to which it is mounted so as to avoid harm to the device. The upper horizontal walls of the reflective means support 801 and rectangular body frame 802 are situated below the camera lens 803 of the smartphone 800 on which the device is installed. The rectangular body frame 802 is configured with an internal space to accept and store a reflective means support 801. When the device is not in use, the reflective means support 801 is contained in the internal space of the rectangular body frame 802. The interior of the rectangular body frame 802 may be completely hollow, i.e. the rectangular body frame 802 is a shell, or only partially hollow, provided that the rectangular body frame 802 can accept and store the reflective means support 801 when the reflective means support 801 is retracted into said rectangular body frame 802. As illustrated in FIG. 8A, the user has inserted the reflective means support 801 into the rectangular body frame 802 using the thumb slide 804. The top wall 805 of the rectangular body frame 802 is configured in such a way so as to allow for the user to "push" the reflective means support 801 into the rectangular body frame 802 using the thumb slide 804 and to the access the reflecting means support 801 when it is contained/stored in the rectangular body frame 802. In one example, a "T" or "I" shape is cut out from the rectangular body frame 802 to allow the user to push reflective means support 801 into or out of the interior of the rectangular body frame 802.

FIG. 8B illustrates the device when in use. The user pushed the thumb slide 804 forward through the "T" shaped cutout 805 towards the camera lens 803 of the smartphone 800 causing the reflective means support 801 to extend out of the rectangular body frame 802. As depicted in FIG. 8B, the inwardly facing pegs of the legs 806, 807 reflective means support 801 have rotated causing the reflective means support 801 to extend outward from the smartphone 800 on which the device is mount at an angle at a preferred range between 55° and 65°. It should be appreciated that the device can extend the reflective means support 801 at angles greater than or less than the preferred range of 55° to 65° provided that the angle is capable of adequately reflecting the image before the user into the smartphone camera 803. The torsional spring 808 causes the interior facing pegs of the reflective means support 801 to rotate which in turn extends said reflective means support 801 outward from the smartphone 800 it is attached to at the pre-determined angle, preferably between 55° and 65°. Once engaged, the mirror located on the lower wall 809 of the reflective means support 801 re-directs the line-of-sight of the user into the lens 803 smartphone 800.

It is important that the device have a stopping mechanism to prevent over-extension of the reflective means support 300. In the preferred embodiment, the stopping mechanism 410a (FIG. 4) (the "upward notch") is built in to one or both of the grooves/channels 410 of the outer rectangular body frame 400. The outwardly facing cams 308, 309 attached to the legs 304, 305 of the reflective means support 300 are "cam shaped", rather than being circular, to facilitate the stopping function. As the outwardly facing cams 308, 309 reach the end of the groove/channel 410, they rotate freely inside of the widened opening 410A of the groove/channel 410. When the reflective means support 300 rotates, the "cam shape" of the outwardly facing cams 308, 309 will eventually engage the upward notches 410A, creating a stopping point. The exact geometry of the upward notches 410A can be adjusted to control the angle that the outwardly facing cams 308, 309 can rotate and by extension, this function controls how much the reflective means support 300 will rotate. FIG. 11 illustrates the positioning of the "stopping" cam when the device is in the closed position and the cam is completely in the channel FIG. 11a and when the device is in the open position and the cam is positioned in the "upward notch" FIG. 11b.

Figure 9C:
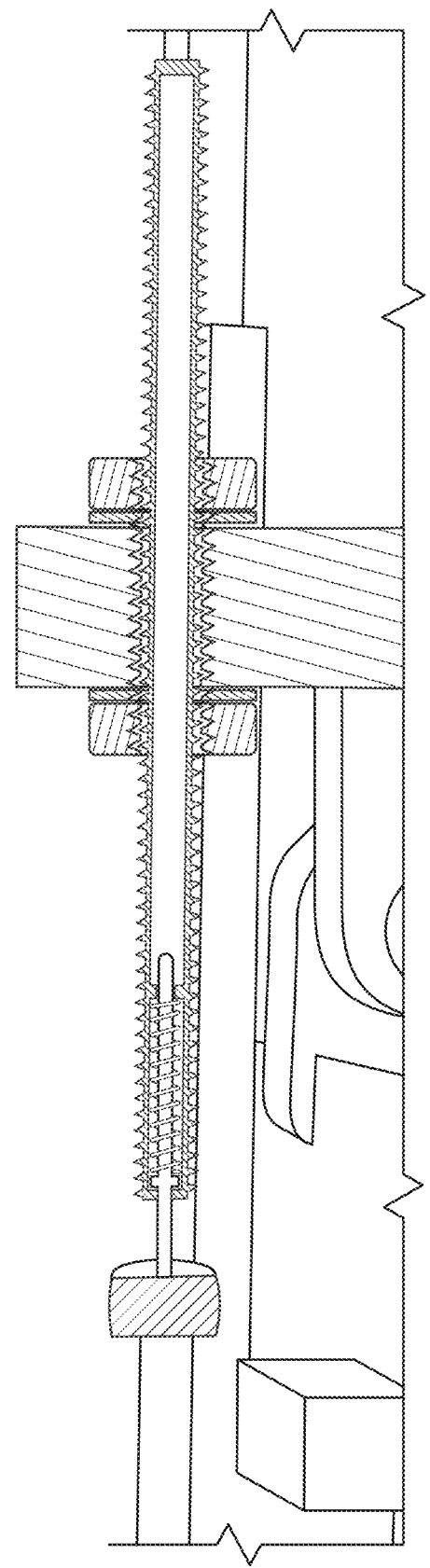
Figure 10:
FIG. 10 illustrations of the types of images displayed on a user's smartphone when utilizing the Type While Walk (https://itunes.apple.com/us/app/type-while-walk/id72158-4816?mt=8) and Walking Text (https://play.google.com/store/apps/details?id=com.andpi.walktext) mobile phone applications.

FIG. 9A depicts a second stopping mechanism 900 that prevents the over-extension of the reflective means support 901. As shown, the rectangular body frame 902 may also include means 903 in which to support the stopping mechanism 900. In one example, a screw 904, nuts 905, and washers 906 are used. The head of the screw 904 is positioned into place by the nuts 905a, 905b. When the reflective means support 901 is extended outward by the torsional spring 906, it encounters the head 904a of the screw 904 preventing any further outward movement by the reflective means support 901. The top horizontal wall of the rectangular body frame 902 is designed with means (the "stopping mechanism support means") in which to secure the stopping mechanism 900 to the rectangular body frame 902. In the example depicted in FIG. 9A, the stopping mechanism support means 903 consists of a circular extension capable of allowing the screw 904 to extend through the entirety of the stopping mechanism support means 903. It should be appreciated that the stopping mechanism 900 is not limited to a screw/nut combination. Springs, rubber or plastic stoppers and the like may also be used as stopping mechanisms in the design of the instant invention. It is important, however, that the user be able to adjust the position of any stopping mechanism as several parameters, such as the height of the user and/or the incline of the surface the user is walking on, can require a different angle of extension of the reflective means support 901. FIG. 9B is a close-up view of the stopping mechanism 900 as installed in the stopping mechanism support means 903. FIG. 9C is a depiction of the side view of an embodiment having a spring-loaded absorber stopping means affixed to the device which prevents the reflective means support from over extending.

A publicly-available app that is loaded onto the user's smartphone displays the re-directed image on the screen of the smartphone on which the claimed device is affixed.

The various components of the claimed device may be formed by hand or machine or using an additive manufacturing process ("3D printing"), laser cutting, constructed molding, thermal forming, vacuum forming processes or any other processes known in the art to manufacture mechanical parts. In addition, components, i.e. the rectangular body frame, reflective means support and rear support of the claimed device, are separately formed due to the rotational/movement requirements of the claimed device. The various parts of the components, such as walls, legs and extensions may also be individually formed and later assembled to form the various components or said parts can be integrally formed of the same material. For example, each section can be individually constructed using one or more of stamping, machining, working, casting, extrusion, or any combinations of these. Various types of adhesives may be used to assemble the parts into the components. It is preferable, however, to integrally form the various components, because their strength is increased.

Although the various components may be formed from a variety of materials, plastics are preferred as the various moving parts are subject to friction which can prematurely wear the component. Plastics that perform well in friction applications, include UHMW (ultra-high-molecular-weight polyethylene), PEEK (polyetheretherketone), polycarbonate, nylon and acetal which are excellent choices for wear applications that involve sliding were preferred. These materials are also available in formulations that include additives and fillers to improve sliding wear performance.

In some embodiments, the components and/or parts of the components can be constructed from a glass-filled polyethylene terephthalate ("PET"). Alternatively, the components and/or parts of the components can be constructed from a high-strength plastic such as polyaryletherketone ("PAEK") or polyether ether ketone ("PEEK").

In the preferred embodiment, the device is permanently mounted to the back of a smartphone or smartphone case. In other embodiments, the device is detachably mounted to the back of a smartphone or smartphone case. In yet other embodiments, the device is integrated into the smartphone case during the manufacturing process to make said case.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

I claim:

1. A device to re-direct the line of sight of a camera function of a smartphone comprising
   a reflective means;
   a rectangular body frame comprising a top wall, a bottom wall, two vertical side walls, a back horizontal wall, and a partial front horizontal wall formed from two L-shaped opposing sections further comprising opposing channels formed into the sides of the vertical walls facing the hollow interior of the rectangular body frame provided said rectangular body frame has an open interior;

a reflective means support upon which said reflective means is affixed thereto comprising an upper wall, a lower wall, two vertical opposing side walls, two opposing horizontal walls, and two downward, rounded extensions both having an outer wall and an inner wall wherein said reflective means support is inserted into the interior of said rectangular body frame when the device is not in use, and extends outward from the interior of said rectangular body frame when in use;

a cam attached to the outer wall of each downward, rounded extension of the rectangular reflective means support wherein said cams are retained in and are capable of moving upward and downward in said channels formed into said vertical walls of said rectangular body frame;

a rear support that fits within the interior of the rectangular body frame having two opposing extensions wherein each extension has a hole traversing the width of said extension;

a peg attached to each inner wall of each extension wherein said pegs are inserted into said traversing holes in the rear support provided that said pegs can rotate within said holes of said extensions; and a torsional spring rotationally mounted on the reflective means support wherein said torsional spring causes the reflective means support to extend outward from the smartphone on which said device is attached.

2. The device according to claim 1, wherein said reflective means is a mirror.

3. The device according to claim 1, wherein said mirror is affixed to said reflective means support using an adhesive selected from the group consisting of acrylics, bio-adhesives, contact adhesives, cyanoacrylics, epoxies, ethylene-vinyl acetate-based hot-melts, glue, hot melt adhesives, neoprene, paste, polymer dispersion adhesives, pressure sensitive adhesives, resins, polyimides, polyols, polyurethane, pressure sensitive adhesive, rubber cement, thermoset epoxies, thermosetting polymers, ultraviolet light curing adhesives and urethanes.

4. The device according to claim 1, wherein said reflective means support further comprises one or more walls attached to the outer edges of said rectangular support wherein said walls have inward facing flanges capable of retaining said mirror to said reflective means support wherein said walls are made from a material that can be crimped wherein when said mirror engages said walls, said walls may be crimped so as to retain said mirror.

5. The device according to claim 1, further comprising upward indentations formed into said channels wherein said indentations are capable of engaging said cams and securing said cams in place until said cams are forced out of said indentations by the user.

6. The device according to claim 1, further comprising a thumb slide attached to top side of said reflective means support and having a rectangular shape with upwardly extended ribs or shaped like a nail.

7. The device according to claim 6, wherein a T- or I-shaped cutout is formed in the top wall of said rectangular body frame provided said cutout allows the a user to push the thumb slide causing the reflective means support to slide into and out of the rectangular body frame.

8. The device according to claim 1, wherein said torsional spring causes the reflective means support to extend outward from the smartphone on which said rectangular means support is attached at an angle of extension.

9. The device according to claim 8, wherein said torsional spring causes the reflective means support to extend outward at an angle of extension between 55° and 65° relative to the back of the smartphone.

10. The device according to claim 1, wherein said channels have upward notches at the end of each channel closest to the partial horizontal wall so as to stop the reflective means support from extending beyond the recommended angle of extension.

11. The device according to claim 1, further comprising an external stopping means.

12. The device according to claim 11, wherein said stopping means is a spring-loaded absorber.

13. The device according to claim 1, wherein the components of said device are made using one or more processes selected from the group consisting of an additive manufacturing process ("3D printing"), laser cutting, constructed molding, thermal forming, vacuum forming, stamping, machining, working, casting, extrusion and any combination thereof.

14. The device according to claim 1, wherein the components of said device are manufactured from materials selected from the group consisting of UHMW (ultra-high-molecular-weight polyethylene), polycarbonate, nylon, acetal, polyaryletherketone ("PAEK"), polyether ether ketone ("PEEK") and any combination thereof.

15. The device according to claim 1, wherein said device is attached directly to the back of a smartphone or is attached to the back of a smartphone case or is fabricated into a smartphone case.

16. The device according to claim 1, wherein said housing is formed with rounded edges.

17. The device according to claim 1, further comprising a slot formed within the wall between the two downward, rounded extensions of the reflective means support wherein said slot supports said torsional spring.

* * * * *